United States Patent
Bendersky et al.

(10) Patent No.: US 9,061,907 B2
(45) Date of Patent: Jun. 23, 2015

(54) TWO-COMPONENT STRUCTURES PROVIDING FAST-LOW TEMPERATURE CHARGING OF MG WITH HYDROGEN

(71) Applicant: National Institute of Standards and Technology, Gaithersburg, MD (US)

(72) Inventors: Leonid A. Bendersky, Montgomery Village, MD (US); Edwin J. Heilweil, Potomac, MD (US); Zhuopeng Tan, Dongguan (CN)

(73) Assignee: The United States of America as represented by the Secretary of Commerce The National Institute of Standards and Technology, Washington, DC (US)

( * ) Notice: Subject to any disclaimer, the term of this patent is extended or adjusted under 35 U.S.C. 154(b) by 276 days.

(21) Appl. No.: 13/623,088

(22) Filed: Sep. 19, 2012

(65) Prior Publication Data

US 2013/0068998 A1    Mar. 21, 2013

Related U.S. Application Data

(60) Provisional application No. 61/537,237, filed on Sep. 21, 2011.

(51) Int. Cl.
*C01B 3/00* (2006.01)
*C22C 23/00* (2006.01)

(52) U.S. Cl.
CPC ................. *C01B 3/00* (2013.01); *C01B 3/0031* (2013.01); *C01B 3/0078* (2013.01); *Y02E 60/327* (2013.01); *C22C 23/00* (2013.01)

(58) Field of Classification Search
CPC .... C01B 3/0031; C01B 3/0078; C22C 23/00; Y02E 60/327
USPC .............. 429/218.2, 220, 221, 223, 224, 225, 429/226
See application file for complete search history.

(56) References Cited

U.S. PATENT DOCUMENTS

| | | | |
|---|---|---|---|
| 4,249,654 | A | 2/1981 | Helversen |
| 4,457,891 | A | 7/1984 | Bernauer et al. |
| 5,391,366 | A | 2/1995 | Yamamoto et al. |
| 5,506,069 | A | 4/1996 | Ovshinsky et al. |
| 5,554,456 | A | 9/1996 | Ovshinsky et al. |
| 5,567,303 | A | 10/1996 | Yamamoto et al. |
| 5,616,432 | A | 4/1997 | Ovshinsky et al. |
| 5,700,443 | A | 12/1997 | Yamamoto et al. |
| 6,130,006 | A | 10/2000 | Kohno et al. |
| 6,337,146 | B1 | 1/2002 | Sogabe et al. |
| 6,589,312 | B1 | 7/2003 | Snow et al. |
| 7,118,611 | B2 | 10/2006 | Snow et al. |
| 7,175,826 | B2 | 2/2007 | Lemmon et al. |
| 7,279,222 | B2 | 10/2007 | Hearley |

(Continued)

*Primary Examiner* — Eisa Elhilo
(74) *Attorney, Agent, or Firm* — Steve Witters; Witters & Associates

(57) ABSTRACT

A hydrogen storage material is provided, the hydrogen storage material comprises a hydride-forming solid disposed in a film, a hydrogen-diffusing solid media disposed in the film with the hydride-forming solid, and a high density of interfaces between the hydride-forming solid and the hydrogen-diffusing solid media in the film. The hydrogen storage material may be made by co-depositing the hydride-forming solid and the hydrogen-diffusing solid media to form the film having different solid phases of the hydride-forming solid and the hydrogen-diffusing solid media and a high density of interfaces therebetween.

20 Claims, 11 Drawing Sheets

(56) References Cited

U.S. PATENT DOCUMENTS

| | | |
|---|---|---|
| 7,416,583 B2 | 8/2008 | Colibaba-evulet |
| 2004/0065171 A1 | 4/2004 | Hearley et al. |
| 2004/0142203 A1* | 7/2004 | Woolley ................. 428/615 |
| 2004/0213998 A1 | 10/2004 | Hearley et al. |
| 2005/0126663 A1 | 6/2005 | Fetcenko et al. |
| 2009/0116992 A1 | 5/2009 | Lee et al. |
| 2009/0174512 A1 | 7/2009 | Watanabe et al. |
| 2010/0021818 A1* | 1/2010 | Van Thiel et al. .......... 429/218.2 |

* cited by examiner

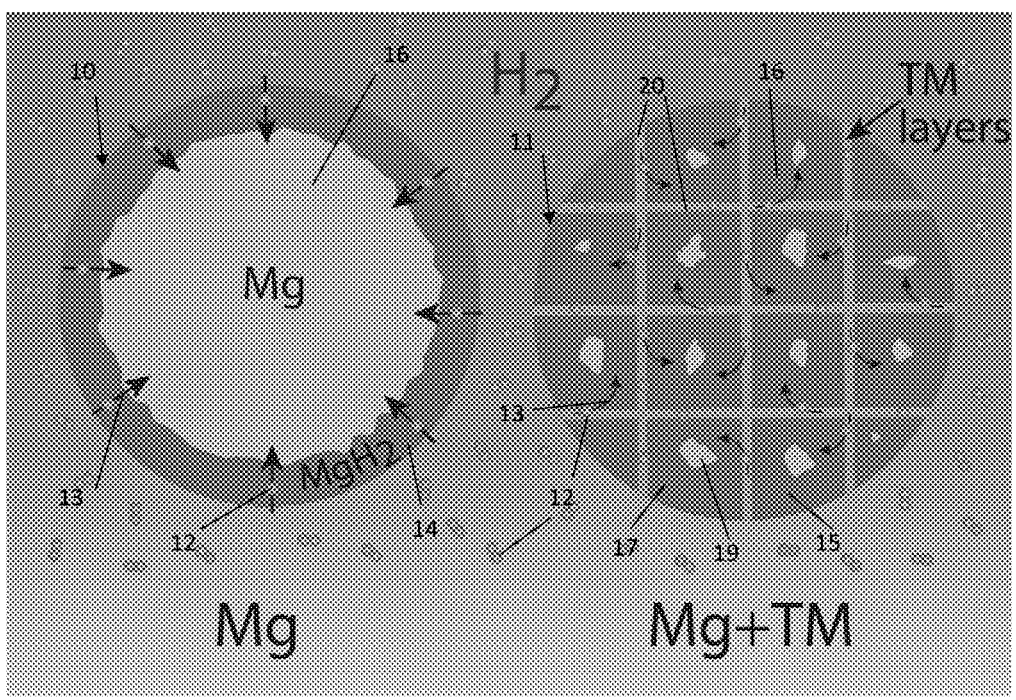
Figure 1a                    Figure 1b

Mg-5Fe

Mg-15Fe

US 9,061,907 B2

TWO-COMPONENT STRUCTURES PROVIDING FAST-LOW TEMPERATURE CHARGING OF MG WITH HYDROGEN

CROSS-REFERENCE TO RELATED APPLICATIONS

This application claims the benefit under 35 U.S.C. §119(e) of U.S. Provisional Application No. 61/537,237, entitled "Two-Component Structures Providing Fast-Low Temperature Charging Of Mg With Hydrogen", filed Sep. 21, 2011, which is hereby incorporated herein by reference in its entirety.

STATEMENT REGARDING FEDERALLY SPONSORED RESEARCH OR DEVELOPMENT

This work is funded by the National Institute of Standards and Technology under the U.S. Department of Commerce.

FIELD

Aspects of the present invention generally relate to hydrogen storage materials and methods of forming hydrogen storage materials.

BACKGROUND

Hydrogen may be used as a renewable fuel. For example, hydrogen may be produced by electrolysis, stored, and used as a fuel. Hydrogen fuel may be used to power fuel cells in automobile applications, for example. Storing of the hydrogen may present obstacles as hydrogen may pass through the walls of traditional high pressure gas tanks. Recently, solid materials, such as metals, have been used to chemically store and release hydrogen.

Metal hydride alloys are metal alloys that absorb and desorb hydrogen. Mg, $Mg_2Ni$, FeTi are examples of metal hydride metals and alloys that absorb and desorb hydrogen. Hydrogen charging/discharging processes in metal hydrides, providing hydrogen storage, may have the characteristics of solid-state transformations. The kinetics of the transformation may depend on thermodynamic driving forces and nucleation barriers. For example, charging of hydrogen storage materials may necessitate the delivery of hydrogen from a gas phase to the interior of the material to form a hydride phase and discharging of hydrogen storage materials may necessitate the removal of hydrogen from the hydride phase to a gas phase.

Although the diffusion of hydrogen in most materials may be fast, the diffusion in metal hydrides may typically be slow and may be a limiting factor of the transformation. To overcome these limitations, the common practice has been to increase a solid/gas surface area and decrease the diffusion distance to the interior of the particle by refining particle size. For example, particle size refinement has been achieved by mechanical attrition (e.g., ball milling). Additives have also been used to facilitate the milling process and improve the dissociation of molecular hydrogen from surfaces of the metal hydride.

Recently, Mg-based hydrides have attracted attention in the development of solid-state hydrogen storage systems due to the high hydrogen content of $MgH_2$, low cost of Mg, and single-step reaction path. However, challenges remain with the usage of Mg-based hydrides. For example, the use of Mg-based hydrides in hydrogen storage systems for fuel cells may cause high thermodynamic stability of the hydrogen storage system which may lead to excessively high operating temperatures (e.g. $T \geq 673$ K) and/or sluggish kinetics of the hydrogen storage system. Modification of the thermodynamic and kinetic properties of Mg-based hydrides has typically been focused on the powder/grain refinement and alloying/catalyzing of magnesium, predominately by ball milling. These approaches may not provide desirable operating temperatures and/or kinetics of the hydrogen storage systems in some applications.

What is needed are improved hydrogen storage systems and materials and methods of making the same.

SUMMARY

According to one aspect of the present invention, a hydrogen storage material comprises a hydride-forming solid disposed in a film, a hydrogen-diffusing solid media disposed in the film with the hydride-forming solid, and a high density of interfaces between the hydride-forming solid and the hydrogen-diffusing solid media in the film.

According to another aspect of the present invention, a hydrogen storage material is made by co-depositing a hydride-forming solid and a hydrogen-diffusing solid media to form a film having a high density of interfaces between the hydride-forming solid and the hydrogen-diffusing solid media.

According to yet another aspect, a hydrogen storage material comprises a hydride-forming solid and a hydrogen-diffusing solid media disposed in a film, the hydride-forming solid and the hydrogen-diffusing solid media form different solid phases with a high density of interfaces therebetween upon forming the film by co-depositing the hydride-forming solid and the hydrogen-diffusing solid media.

BRIEF DESCRIPTION OF THE DRAWINGS

FIG. 1a is a schematic drawing of a hydrogenation process in a single-phase particle;

FIG. 1b is a schematic drawing of a phase-separated structure of the present disclosure showing hydrogen atoms entering a particle's interior;

FIGS. 2a-2d show bright field images and corresponding SAED patterns of aspects of a hydrogen storage material of the present disclosure wherein FIGS. 2a and 2c show a hydrogen storage material comprising $Mg_{0.95}Fe_{0.05}$ and FIGS. 2b and 2d show a hydrogen storage material comprising $Mg_{0.85}Fe_{0.15}$;

DETAILED DESCRIPTION

Figure 2A:
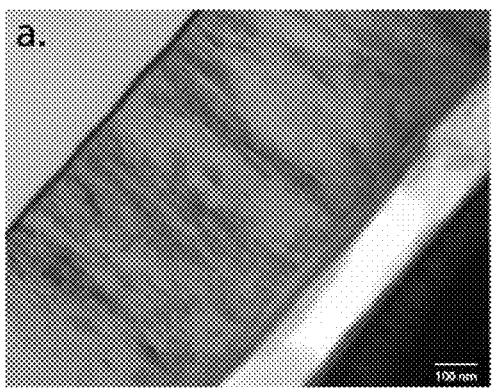

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that may each be used independently of one another or in combination with other features. However, any single inventive feature may not address any of the problems discussed above or may only address a subset of the problems discussed above. Further, one or more of the problems discussed herein may not be fully addressed by any of the features described below.

A hydrogen storage material and method of making is presently disclosed. The presently disclosed hydrogen storage material may provide for hydrogen charging/discharging processes having characteristics of solid-state transformations, the kinetics of the transformation may depend on thermodynamic driving forces and nucleation barriers.

In at least one aspect of the present disclosure, the presently disclosed hydrogen storage material may provide improved kinetics of hydrogenation which may be based on a material having a high density of interfaces between a hydride-forming solid (HFS) and a hydrogen-diffusing solid media (HDM). Such materials may be realized for phase-separated systems when synthesized in the conditions limiting kinetics of phase separation, e.g., in thin film deposition or co-deposition.

Morphological conditions that may be desired for fast hydrogen charging include the continuity of HDM channels and the small sizes of HFS domains. Such morphology may be achieved for phase separated systems in the conditions limiting kinetics of separation. The kinetic limiting conditions may be achieved during rapid melt quenching or thin film deposition or co-deposition of the HDM and HFS. For the conditions of negligible bulk diffusion, the lateral separation scale may be determined by the interplay between surface diffusion, anisotropy, and growth rate. Different continuous morphologies, such as cylindrical or lamellar, may be developed. Additionally, transverse separation and self-assembled super lattice may be formed in certain conditions.

Mg may provide an advantageous HFS in phase-separating systems disclosed herein and may be useful for hydrogen storage. Mg may not form compounds with a number of transition metals (TMs) and the solubility of TMs in Mg may be negligible. For example, Mg may be immiscible, or substantially immiscible, with Fe and bcc Fe (body-centered cubic lattice structure Fe) and there is a very high diffusivity of hydrogen in Fe, even at low temperatures ($D \approx 10^{-6}$ cm$^2$/s at 25° C.).

Mg—Fe systems in thin films and/or bulk materials may provide significantly accelerated kinetics as compared to other Mg-based alloys. Another advantage in Mg—Fe systems may be the reaction with hydrogen that may form ternary hydride $Mg_2FeH_6$, which may provide better thermodynamic properties than $MgH_2$. Therefore, Mg—Fe films disclosed herein may provide a desired hydrogen storage material. For example, Mg-4 atomic % Fe films may provide enhanced hydrogenation kinetics, in comparison to pure Mg, with a thermodynamic parameter similar to pure Mg. For all the aforementioned reasons, Mg—Fe thin films of different compositions were selected in this disclosure to show the feasibility of a two-component HFS/HDM system for enhancement of hydrogenation kinetics. However, the present disclosure is not limited to Mg—Fe thin films as other HFS/HDM systems may provide a hydrogen storage material comprising a high density of interfaces between a hydride-forming solid and a hydrogen-diffusing solid media in the film.

It is to be understood that the Mg—Fe thin films disclosed herein are only an example of a two-component HFS/HDM as other and different HFS and HDM materials may provide the desired characteristics of the presently disclosed hydrogen storage material. Therefore, the present disclosure shall not be limited to Mg—Fe thin films and shall include any hydrogen storage material comprising a hydride-forming solid and a hydrogen-diffusing solid media disposed in a film or in bulk and having a high density of interfaces between the hydride-forming solid and the hydrogen-diffusing solid media.

The hydrogen storage material may be obtained with the co-deposition of an HFS and an HDM wherein the HFS and HDM form interfaces therebetween upon co-deposition. For example, an HFS may comprise metals and alloys, including but not limited to Mg, Li, Na, Al. Advantageously, the HFS used in a thin film exhibits desired hydrogenation/dehydrogenation kinetics without reducing its high hydrogen capacity. Also, the HDM may comprise metals and alloys that form a high density of interfaces between the HFS and the HDM in a film upon co-deposition. For example, the HDM may comprise metals and alloys such as transitional metals, including but not limited to Ti, V, Mn, Fe, Co, Ni, Cu, and Pd.

In at least one aspect of the present disclosure, the hydrogen storage material comprises a bulk material. For example, co-deposition of phase-separating components in appropriate conditions creates phase separation on a surface. The separation pattern may propagate into a bulk as the film grows. Thus, continuity of HDM thought a film or bulk may be achieved. In this aspect, a monolithic, three dimensional, bulk hydrogen storage material may be provided. The bulk hydrogen storage material may have HDM channels throughout a film, thickened film, or bulk, providing three dimensional channels of HDM throughout the hydrogen storage material.

In at least one aspect of the present disclosure, an approach to improve the kinetics of hydrogenation is provided. Instead of the conventional modification of solid/gas surfaces, as may taught in the prior art, a material with high density of interfaces between hydride-forming solids (HFS) and hydrogen-diffusing solid media (HDM) is provided. For example, Mg—Fe is shown to have phase separation during co-deposition. Since $MgH_2$ is a high-capacity hydride and Fe is shown to provide a high diffusivity of hydrogen, the Mg—Fe with a high density of interfaces disclosed herein may provide a hydrogen storage material with improved kinetics of hydrogenation and/or improved hydrogenation capacity.

FIG. 1a schematically shows a hydrogenation process of a single-phase system. Hydrogen atoms 12 are shown entering a Mg particle's 10 non-hydrogenated interior 16, along paths 13, through particle's 10 hydrogenated exterior 14. Hydrogen atoms 12 may have an increasingly greater distance along paths 13, through particle's 10 hydrogenated exterior 14, as hydrogenation precedes. This increasingly greater distance may decrease the hydrogenation capacity of the single-phase system and/or fail to provide desired kinetics of hydrogenation.

FIG. 1b schematically shows a phase-separated structure 11 of the present disclosure. HDM channels 20 may percolate phase-separated structure 11 and act as "highways" for fast delivering of hydrogen 12 throughout a film, bulk or phase-separated structure 11. Hydrogen atoms 12 may enter phase-separated structure's 11 interior 16 through the fast-diffusing HDM channels or layers 20. Hydrogen atoms 12 may then hydrogenate phase-separated structure's 11 through its exterior, as particle 10 of FIG. 1a is hydrogenated, and via HDM channels 20. For example, paths 13 may be throughout phase-separated structure's 11 interior 16 as shown in FIG. 1b. Saturated hydrogen channels 20 may deliver hydrogen 12 to the hydride-forming phase or solid 15, e.g. Mg, through the HFS/HDM interfaces (interfaces between channels 20 and the HFS 15), and HFS 15 may be transformed to a hydride during hydrogen charging.

Phase-separated structure 11 may provide an improved hydrogenation capacity and/or improved kinetics of hydrogenation, as compared to particle 10. For example, a hydrogenated portion 17 of phase-separated structure 11 may be substantially greater than hydrogenated exterior 14 of particle 10, during a like hydrogenation process. Likewise, an un-hydrogenated portion 19 of phase-separated structure 11 may be substantially less than the un-hydrogenated portion, throughout interior 16, of particle 10.

EXAMPLES

The following examples are included to demonstrate embodiments or aspects of the presently disclosed hydrogen storage material. It should be appreciated by those of skill in the art that the techniques disclosed in the examples that follow represent techniques discovered by the inventors to function in the practice of the invention, and thus may be considered to constitute selected embodiments or aspects for its practice. However, those of skill in the art should, in light of the present disclosure, appreciate that many changes may be made in the specific embodiments or aspects that are presently disclosed and still obtain a like or similar result without departing from the spirit and scope of the invention.

To show an example of a two-component HFS/HDM system for enhancement of hydration kinetics, $Mg_{1-x}Fe_x$ thin films with x=0, 0.05, 0.10, 0.15, and 0.30 were prepared by electron beam deposition and were tested for hydrogen absorption and desorption properties. Structural variations of thin films in different stages of hydrogenation processes were analyzed by X-ray diffraction (XRD). Selected as deposited films were also examined by high-resolution and analytical transmission electron microscopy (TEM).

$Mg_{1-x}Fe_x$ thin films (x=0-0.30) capped with Pd were prepared by electron beam deposition/co-deposition and their hydrogenation/dehydrogenation kinetics and cycling properties were tested at 413 K. Mg—Fe was selected as an aspect of the presently disclosed hydrogen storage material for the examples. It is to be understood that other and different HFS/HDM systems may be employed in aspects of the present disclosure. Mg—Fe is hereby shown to be characterized by: 1) Mg—Fe has phase separation upon co-deposition; 2) $MgH_2$ is a high-capacity hydride; and 3) Fe has a high diffusivity of hydrogen. However, other and different HFS and HDM materials may exhibit similar characterizations and are within the scope of the present disclosure.

Example 1

$Mg_{1-x}Fe_x$ (x=0, 0.05, 0.10, 0.15 and 0.30) thin films of 1 μm thickness were co-deposited on c-plane $Al_2O_3$ substrates under ultrahigh vacuum by electron beam evaporation. All films were deposited without heating and subsequently capped with a 6 nm-thick Pd layer to prevent oxidization and facilitate dissociation of hydrogen molecules. The film thickness and composition were controlled in-situ via crystal monitors.

Compositions of the as-deposited thin films were confirmed to be very close to the desired compositions by energy dispersive X-ray spectroscopy (EDS) measurements. All deposited samples were transferred and stored in a glove box filled with high purity Ar gas with moisture level less than 0.03 μL/L to prevent oxidation.

Figure 2B:
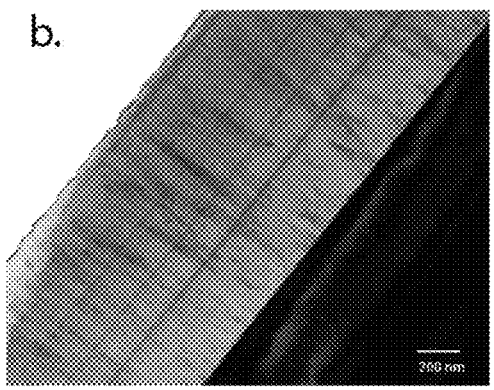
Figure 2C:
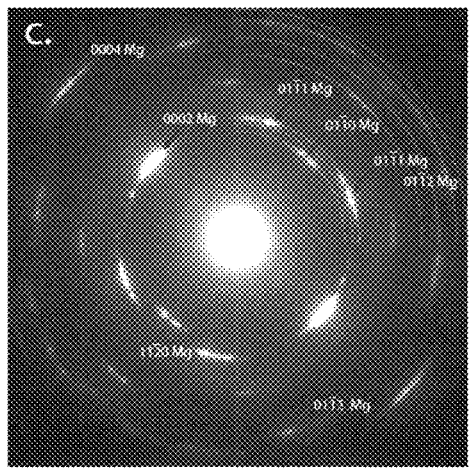
Figure 2D:
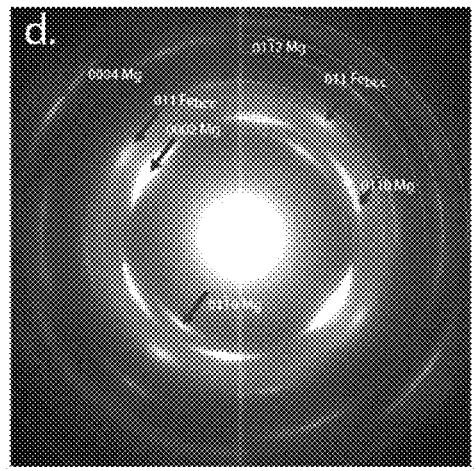

FIGS. 2a-2d show bright field images and corresponding selected area electron diffraction (SAED) patterns taken from samples of as-deposited thin films of $Mg_{0.95}Fe_{0.05}$ (FIGS. 2a and 2c) and $Mg_{0.85}Fe_{0.15}$ (FIGS. 2b and 2d). The bright field images in FIGS. 2a and 2b have a similar diffraction contrast of dark streaks running throughout the films. The streaking contrast may result from grain boundaries, misorientation of narrow columnar grains, and/or second phase channels. Such columnar growth morphology may have preferred growth direction and crystallographic texture.

The SAED patterns in FIGS. 2c and 2d show strong 0002 Mg reflection laying in the direction normal to the substrate plane. The films are clearly dominated by the 0001 Mg texture, which is also apparent in the XRD θ-2θ scans that show only 0002 Mg peak. The presence of other arching reflections of Mg on the SAED patterns, e.g. 0110 or 0111, may indicate that many grains may be tilted away from the 0001 texture. The SAED patterns for both compositions in FIGS. 2a-2d have similar distribution of Mg reflections, however they are noticeably different by the presence of Fe reflections. $Mg_{0.95}Fe_{0.05}$ showed no reflections related to either bcc Fe or fcc Fe (face-centered cubic lattice structure Fe) as shown in the SAED, FIG. 2c, whereas for $Mg_{0.85}Fe_{0.15}$ the 011 reflections of bcc Fe are seen in the form of a diffuse arc, FIG. 2d. Further confirmation of coexistence of bcc-Fe phase with Mg may be shown with HAADF images.

Figure 3A:
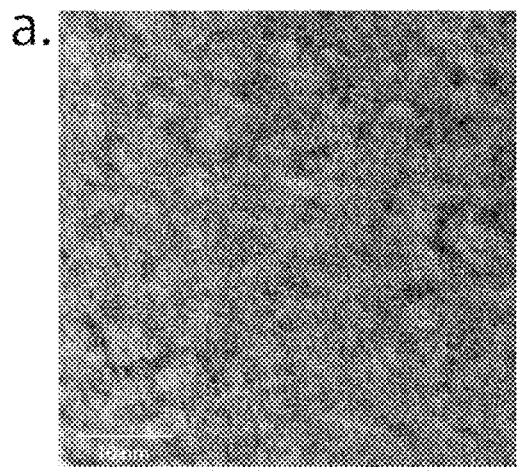
FIGS. 3a-3d show high-resolution images of an aspect of a hydrogen storage material of the present disclosure comprising $Mg_{0.85}Fe_{0.15}$.
Figure 3B:
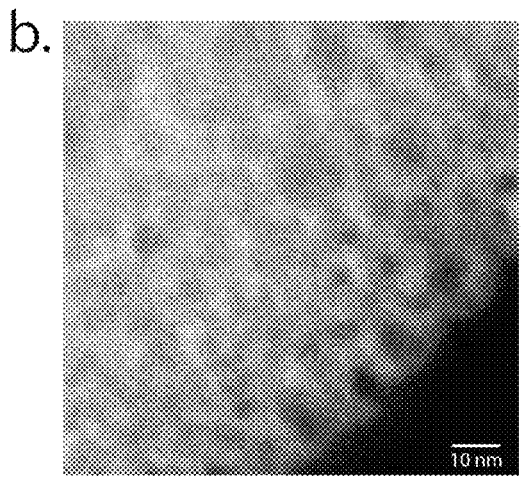
Figure 3C:
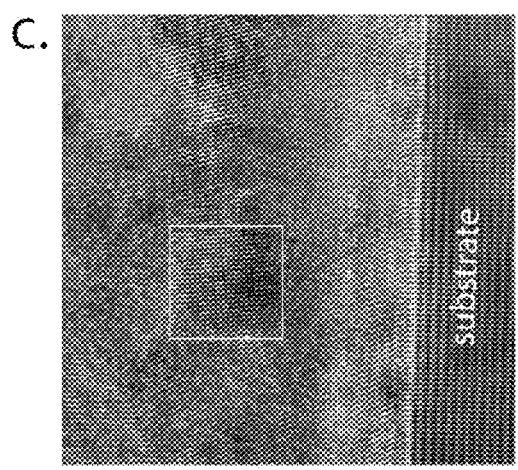
Figure 3D:
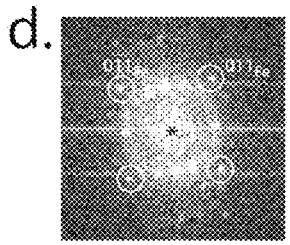

FIG. 3a shows an HAADF image of the $Mg_{0.85}Fe_{0.15}$. Contrast of the HAADF image may be primarily formed by the variations in average atomic number, the Z-contrast, therefore, the brighter regions in the HAADF image may be expected to be higher in density, thus rich in Fe. The HAADF image shows that Fe may form a continuous network of layers or channels embedded into the Mg matrix. Direct evidence that Fe has a bcc structure in the films comes from high-resolution imaging. FIG. 3b shows a density sensitive Z-contrast TEM image, where the bright contrast corresponds to higher density of continuous Fe layers enveloping less than 10 nm grains of Mg. FIG. 3c shows a square region of about 3 nm in size with lattice fringes forming a square lattice. A fast-Fourier transform from the region shows the [001] diffraction pattern corresponding to the bcc structure, FIG. 3d.

Images of the as-deposited films provide evidence that the co-deposition created a microstructure of continuous Fe-rich layers percolating the Mg matrix. Small few nm's size of the Fe grains situated along the layer has very limited correlation length, thus broadening the Fe peaks to the degree that they are not visible in XRD scans.

Example 2

Hydrogen volumetric loading/unloading was performed in a Sieverts apparatus developed at National Institute of Standards and Technology (NIST) with a high precision transducer (0.003% FS) over a relatively wide pressure range. All hydrogen absorption measurements were typically carried out at 413 K with 0.1 MPa $H_2$ pressure for 60 min The hydrogen desorption procedure was at the same temperature and a backpressure of 10 Pa for 60 min. After desorption, the samples were evacuated for another 30 min before the next absorption step. For all the samples, more than ten cycles of hydrogen absorption/desorption were measured at the same hydrogen loading/unloading conditions. The structure variations of the thin films during different cycles were chosen to be analyzed by using a XRD, a RigakuD/max 2400[1] with Cu Kα radiation.

Figure 4:
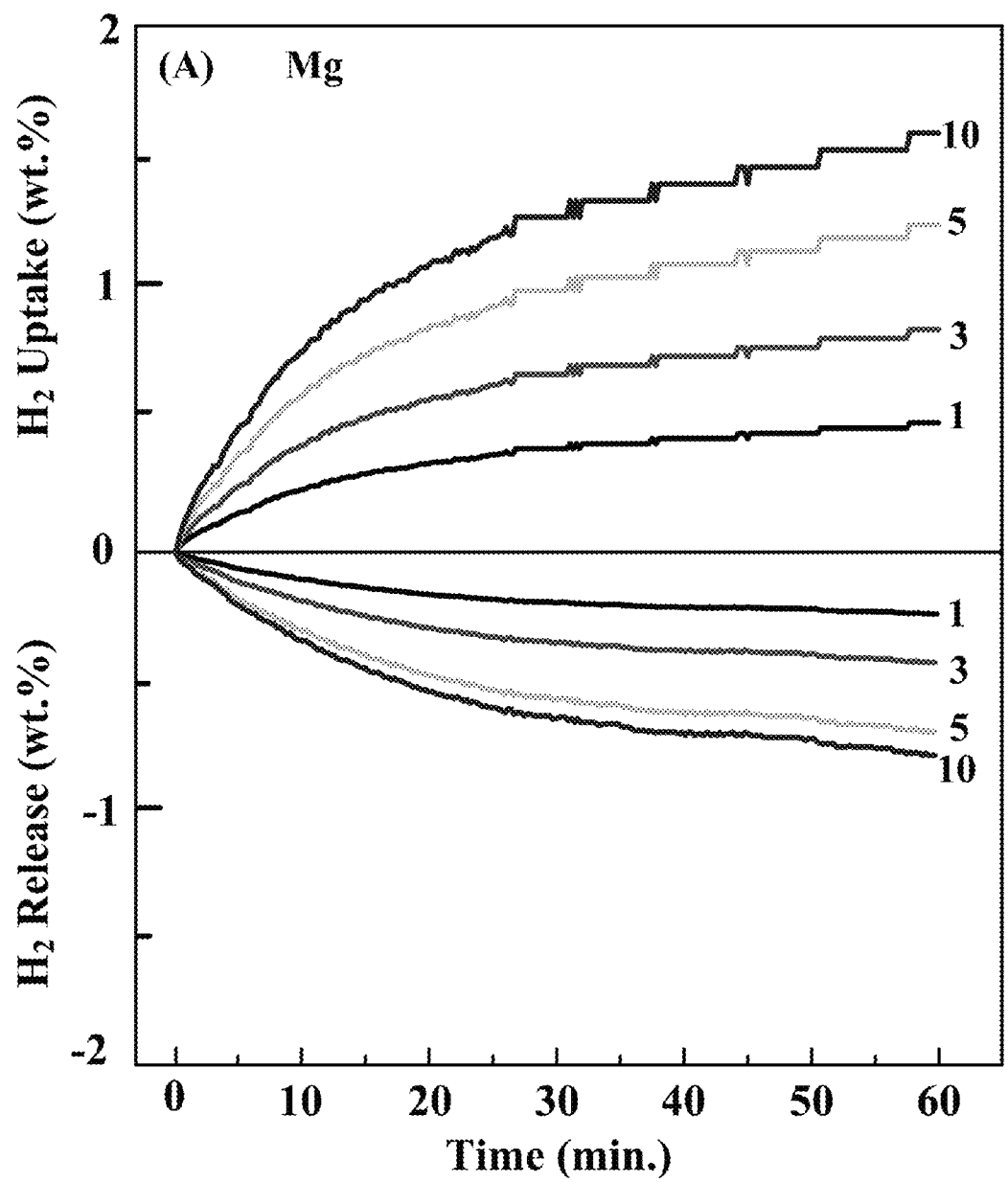
FIG. 4 shows hydrogen absorption and desorption curves of an aspect of a hydrogen storage material of the present disclosure comprising $Mg_{1-x}Fe_x$, at 413K, wherein x=0.
Figure 5:
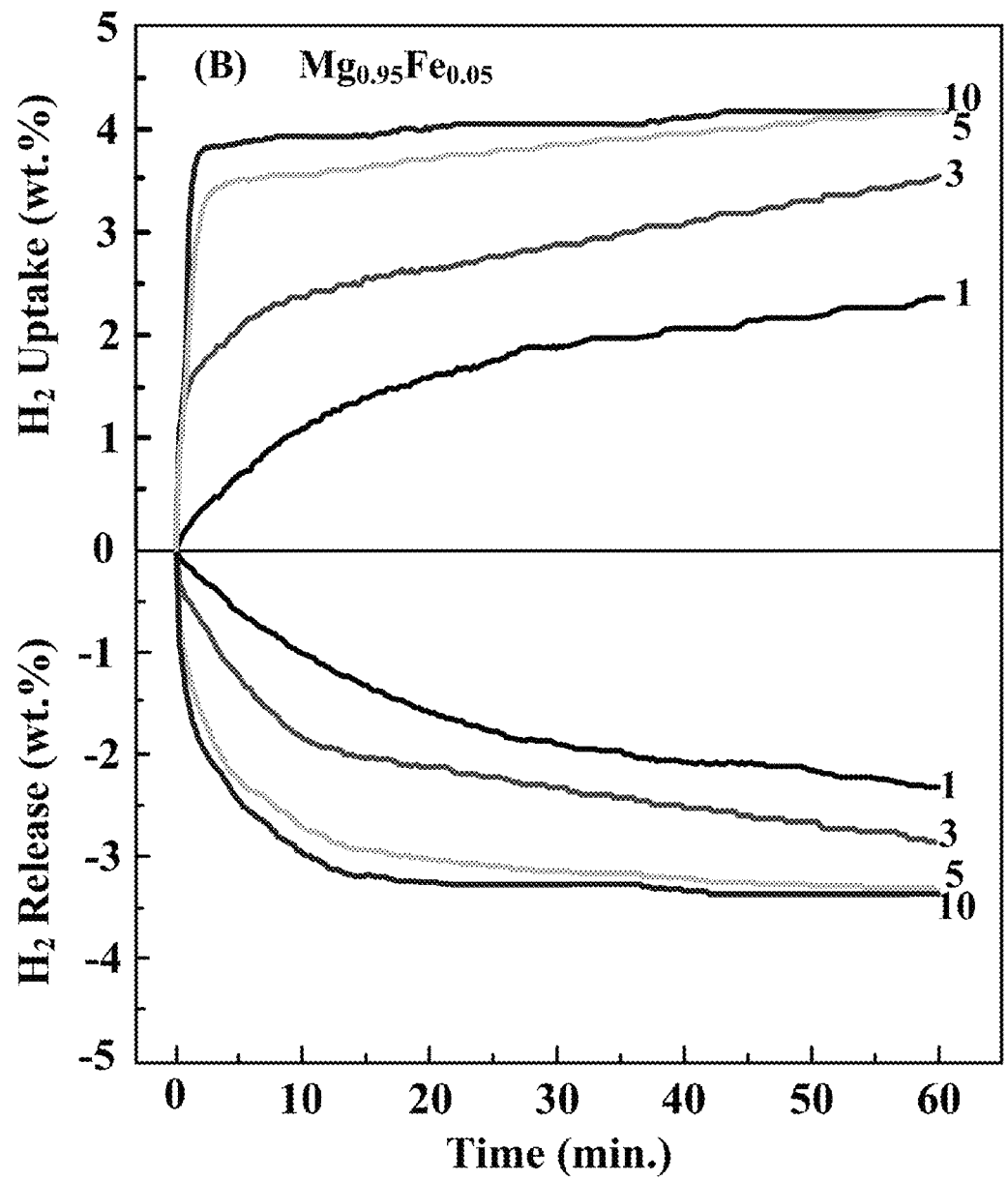
FIG. 5 shows hydrogen absorption and desorption curves of an aspect of a hydrogen storage material of the present disclosure comprising $Mg_{1-x}Fe_x$, at 413K, wherein x=0.05.
Figure 6:
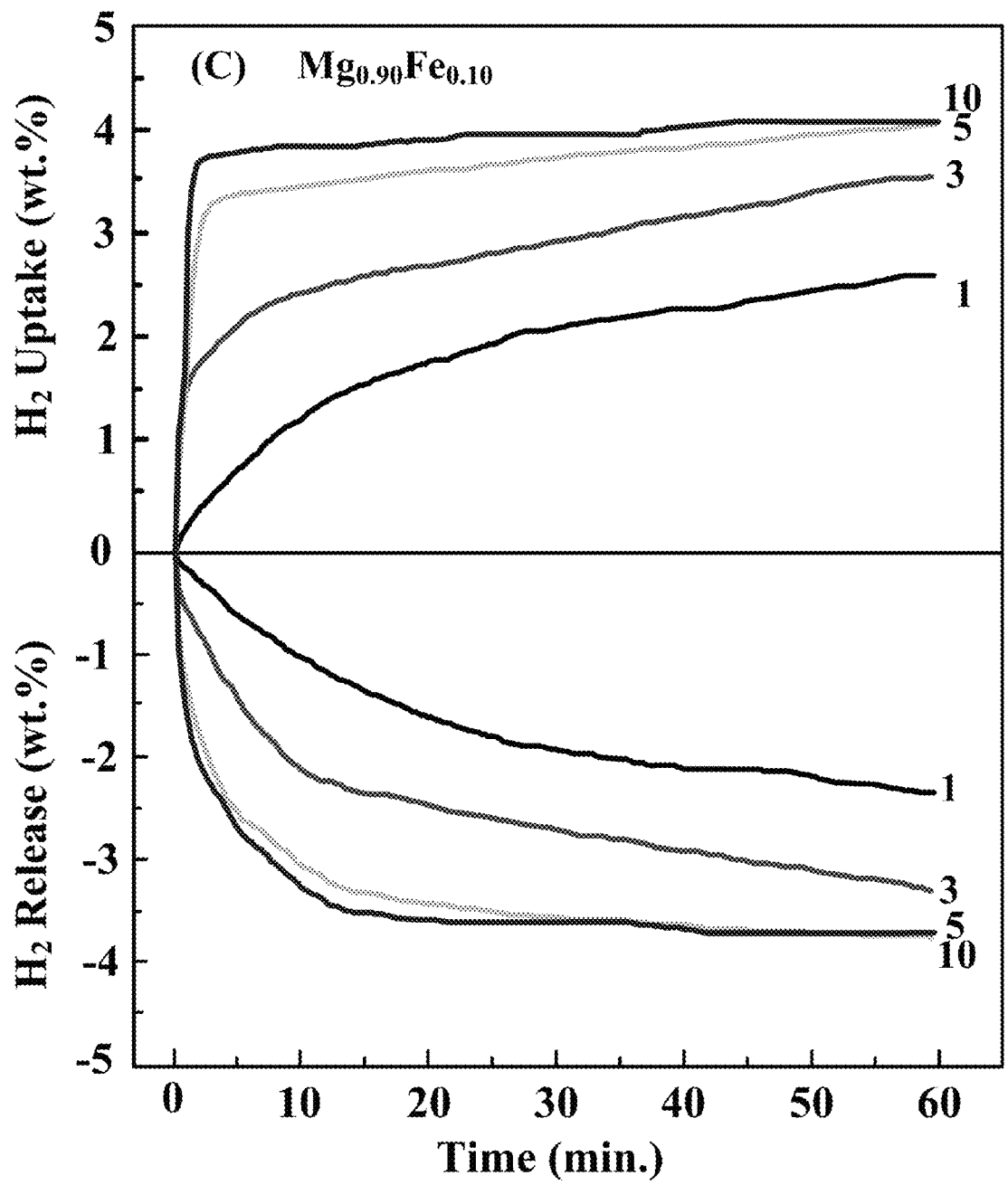
FIG. 6 shows hydrogen absorption and desorption curves of an aspect of a hydrogen storage material of the present disclosure comprising $Mg_{1-x}Fe_x$, at 413K, wherein x=0.10.
Figure 7:
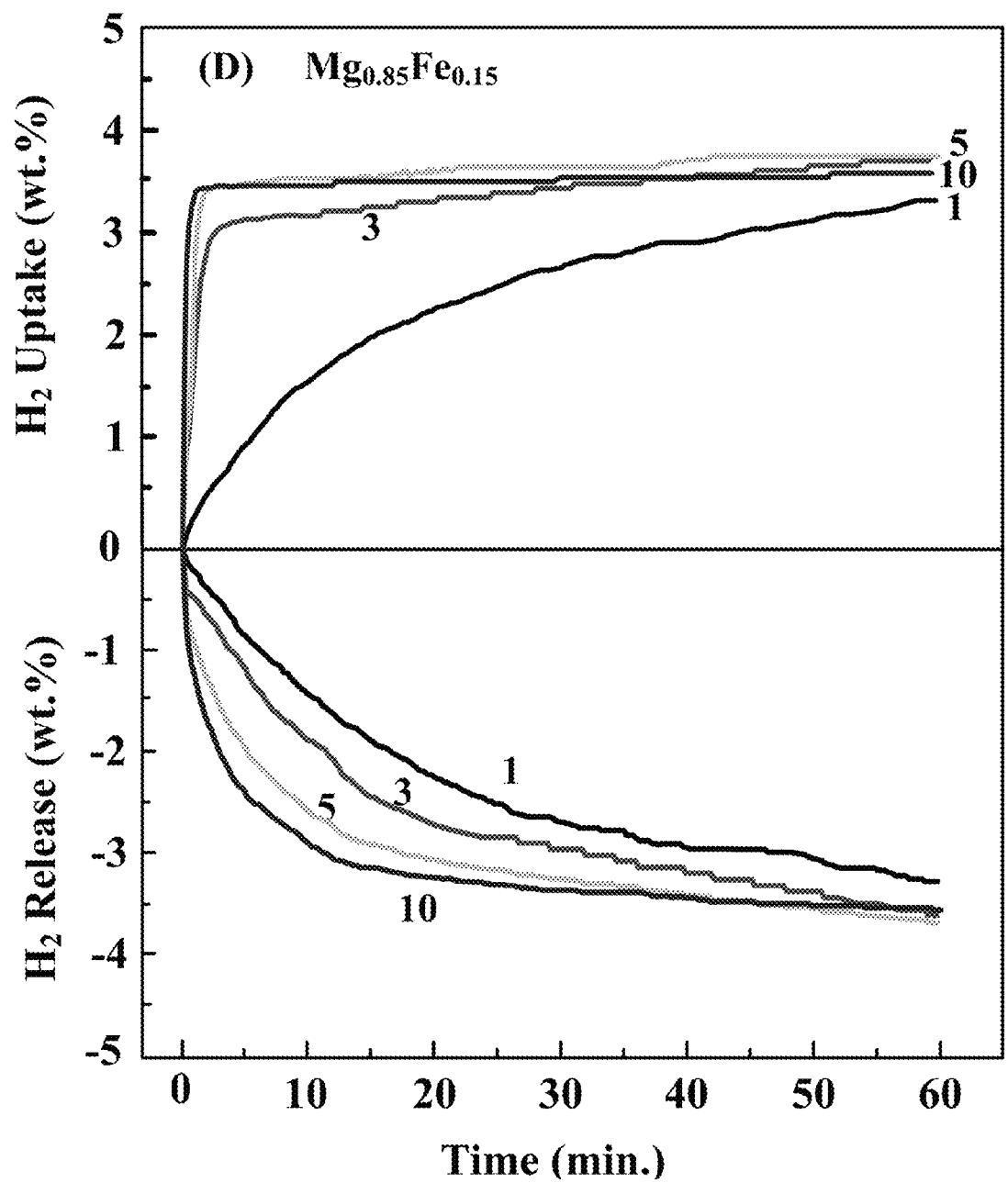
FIG. 7 shows hydrogen absorption and desorption curves of an aspect of a hydrogen storage material of the present disclosure comprising $Mg_{1-x}Fe_x$, at 413K, wherein x=0.15.
Figure 8:
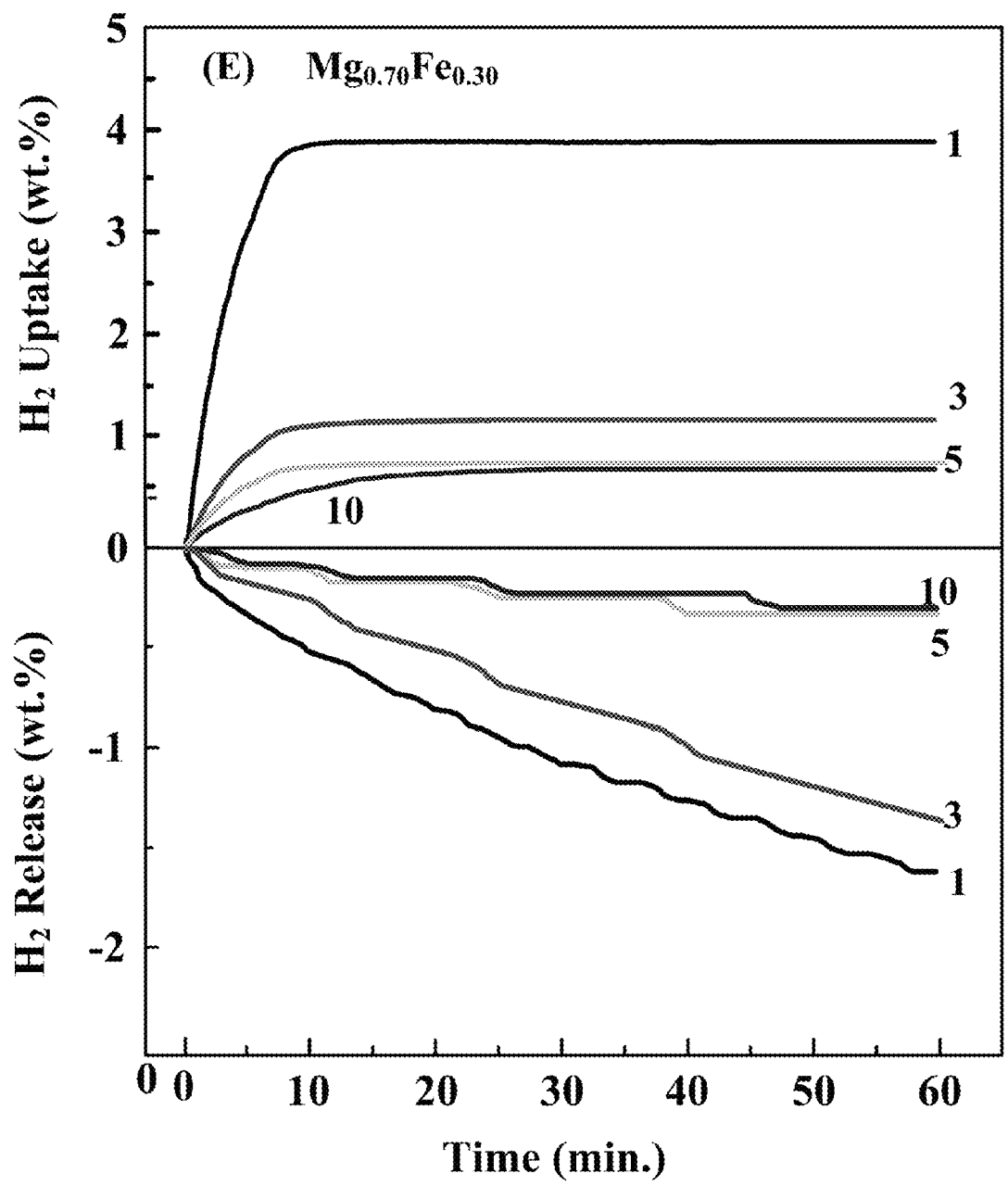
FIG. 8 shows hydrogen absorption and desorption curves of an aspect of a hydrogen storage material of the present disclosure comprising $Mg_{1-x}Fe_x$, at 413K, wherein x=0.30.

The absorption and desorption behaviors for the $Mg_{1-x}Fe_x$ thin films with different compositions (x=0-0.30) during the first, third, fifth and tenth cycle at 413 K are compared in FIGS. 4-8. FIG. 4 shows the hydrogen absorption and desorption curves for pure Mg, FIG. 5 shows the hydrogen absorption and desorption curves for $Mg_{0.95}Fe_{0.05}$. FIG. 6 shows the hydrogen absorption and desorption curves for $Mg_{0.90}Fe_{0.10}$. FIG. 7 shows the hydrogen absorption and desorption curves for $Mg_{0.85}Fe_{0.15}$. FIG. 8 shows the hydrogen absorption and desorption curves for $Mg_{0.70}Fe_{0.30}$. The jaggedness of some absorption and desorption curves may be due to instrumental noise.

FIG. 4 shows measurements for the pure Mg thin film. The parabolic curves exhibit sluggish kinetic and incomplete charging/discharging. During the first cycle, the Mg thin film absorbs less than 0.5% mass fraction hydrogen and desorbs around 0.2% mass fraction in 60 min, respectively. With increasing cycles, both absorption and desorption have significantly improved. However, even after ten cycles, only 1.6% mass fraction hydrogen may be absorbed and 0.7% mass fraction desorbed in 60 min. This is far less than the theoretical value of 7.6% mass fraction expected for a fully hydrided film, which indicates that only a part of the Mg was transformed to $MgH_2$ in the film.

For the $Mg_{0.95}Fe_{0.05}$ and $Mg_{0.90}Fe_{0.10}$ samples (FIGS. 5 and 6), the curves' shape and sequence are almost identical which indicates that an apparent activation period of about 3 cycles may exist, during which the absorption/desorption kinetics is relatively slow. Similar behavior was observed for Mg—Fe—Ti films (detached from a substrate) that were tested in similar conditions (0.3 MPa and 473 K). However, significantly more hydrogen may be absorbed and desorbed in these films than in the pure Mg thin films. For example, even during the first cycle, around 2.0% mass fraction hydrogen may be reversibly absorbed and desorbed in 60 min. After activation, the $Mg_{0.95}Fe_{0.05}$ and $Mg_{0.90}Fe_{0.10}$ films show good reversible hydrogen storage properties with very fast charge/discharge. For example, during the tenth cycle both films may absorb around 3.7% mass fraction in less than 2 min. and desorbed 3.5% mass fraction hydrogen in less than 15 min.

For the $Mg_{0.85}Fe_{0.15}$ films (FIG. 7), the maximum hydrogen absorption and desorption capacities may be obtained in the third cycle. As shown, a 3.5% mass fraction hydrogen was obtained during absorption and a 3.1% mass fraction was obtained during desorption in 60 min. This is slightly less than the values obtained with $Mg_{0.95}Fe_{0.05}$ and $Mg_{0.90}Fe_{0.10}$, which may reflect the increased density with higher Fe content.

The increase of Fe content beyond x=0.15 may result in the degradation of reversible hydrogen storage properties. As FIG. 8 shows, for the $Mg_{0.70}Fe_{0.30}$ films only the first cycle exhibits significant hydrogenation performance of approximately 4.0% mass fraction hydrogen uptake in less than 10 min, with only 1.5% mass fraction hydrogen release in 60 min. However with the further cycling of $Mg_{0.70}Fe_{0.30}$, its hydrogen capacities for both absorption and desorption significantly deteriorate. For example, after five cycles less than 1.0% mass fraction hydrogen may be absorbed and less than 0.5% mass fraction hydrogen may be desorbed.

These examples show that thin films made by co-depositing a small amount of Fe and Mg may have significantly faster kinetics than the pristine or pure Mg. With continuing cycling of the storage hydrogen material of the present disclosure, the kinetics may get slightly accelerated while the values of hydrogen absorption and desorption may remain almost the same. The examples shown above may show that the presence of Fe in the co-deposited films may dramatically improve reversible hydrogen storage properties of Mg thin films and may accelerate kinetics in spite of the increase in overall films' density.

Example 3

A structural analysis was made with X-ray diffraction to show the origin of the effect Fe may have on the hydrogen storage properties of the Mg—Fe film system and structural variations of the films at different stages of hydrogenation process.

Figure 9:
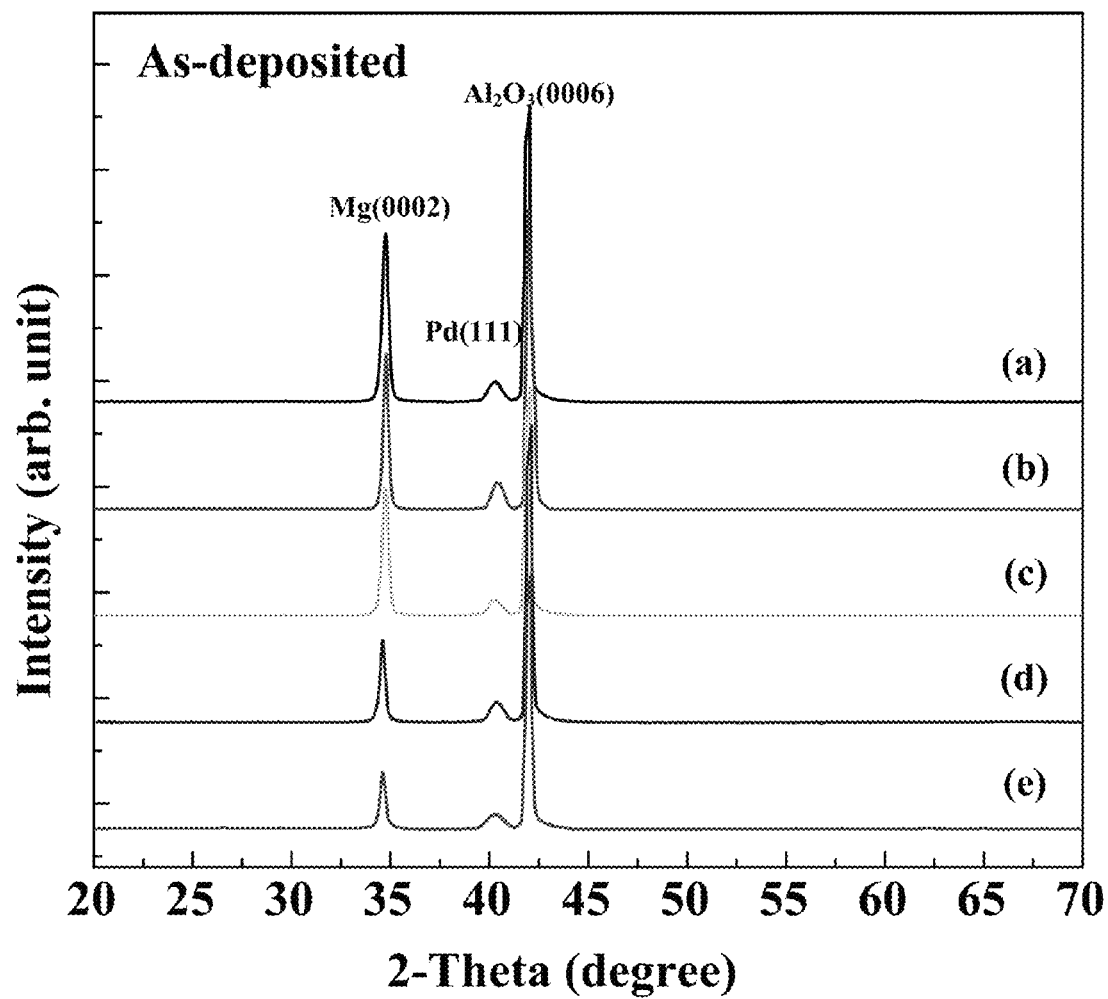
FIG. 9 shows XRD patterns of the as-deposited $Mg_{1-x}Fe_x$ of FIGS. 4-8.

XRD patterns of the as-deposited $Mg_{1-x}Fe_x$ (x=0-0.30) films are shown in FIG. 9. XRD patterns of the as-deposited $Mg_{1-x}Fe_x$ (x=0-0.30) samples are as follows: (a) pure Mg, (b) $Mg_{0.95}Fe_{0.05}$, (c) $Mg_{0.90}Fe_{0.10}$, (d) $Mg_{0.85}Fe_{0.15}$, and (e) $Mg_{0.70}Fe_{0.30}$. The patterns for all films consist of the well-defined (0002) Mg peak at ≈34.5 degrees, the broad peak around 40 degrees of (111) Pd, and the strongest sharp (0006) $Al_2O_3$ peak at 42 degrees coming from the c-cut sapphire substrate. The observed peaks suggest that the present phases, Mg and Pd, may be strongly textured, with (0001)Mg/(0001) $Al_2O_3$ and (111)Pd/(0001)Mg. Nevertheless, peaks belonging to the Fe phases are almost invisible, even for the high concentration Fe samples. Considering the very low solubility of Fe in Mg and immiscibly of the component, this surprising result suggests that Fe may segregate in either amorphous or nanocrystalline state. Also, it is shown that with the increasing Fe content, the intensity of the Mg (0002) peaks becomes lower, which may be the indication that Fe affects correlation length and crystallinity of the Mg phase.

Figure 10:
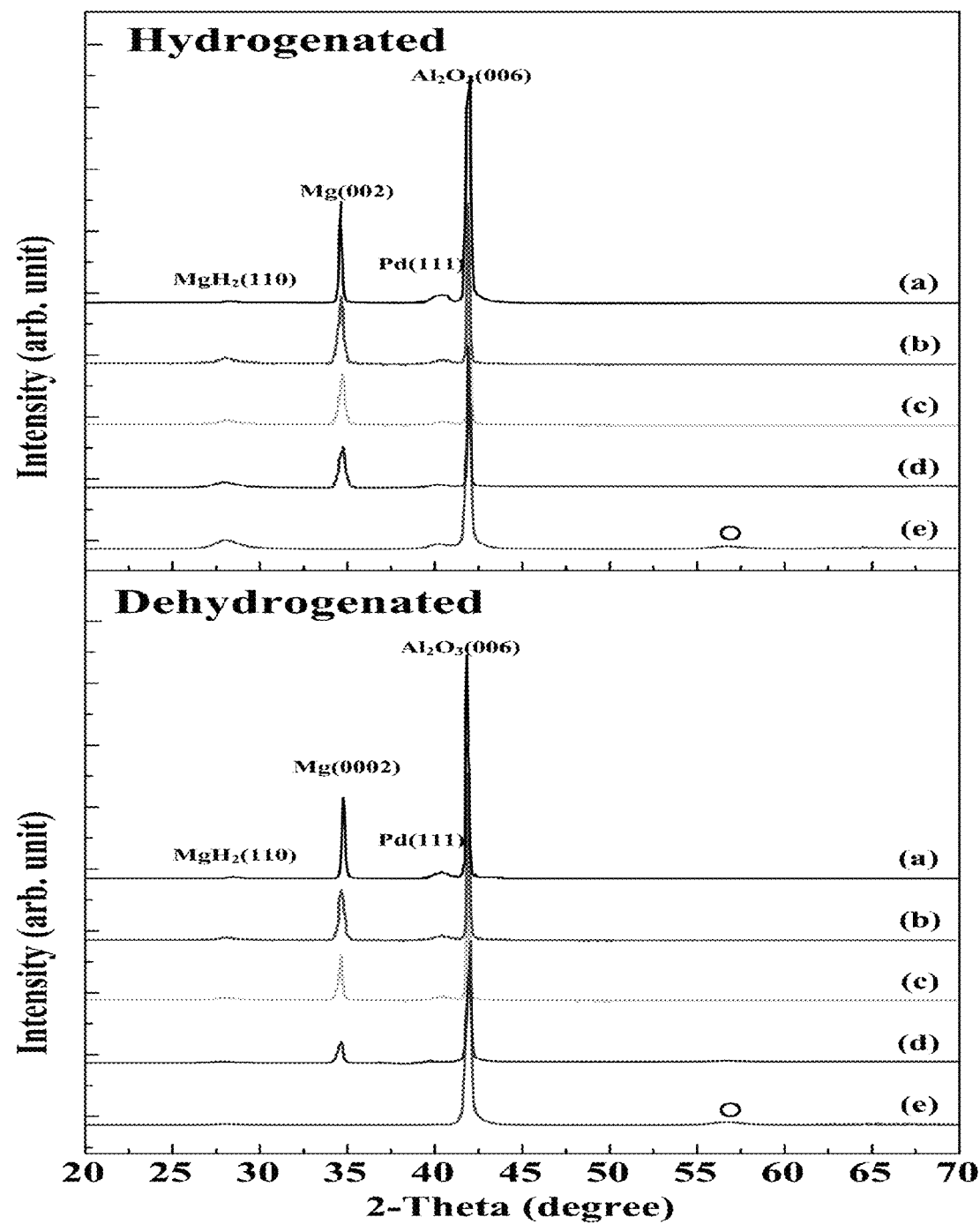
FIG. 10 shows XRD patterns of the hydrogenated and dehydrogenated $Mg_{1-x}Fe_x$ of FIGS. 4-8 during a first cycle.

FIG. 10 shows the XRD patterns for the hydrogenated and dehydrogenated $Mg_{1-x}Fe_x$ thin films during the first cycle. XRD patterns of the hydrogenated and dehydrogenated $Mg_{1-x}Fe_x$ (x=0-0.30) samples during the first cycle are as follows: (a) pure Mg, (b) $Mg_{0.95}Fe_{0.05}$, (c) $Mg_{0.90}Fe_{0.10}$, (d) $Mg_{0.85}Fe_{0.15}$, and (e) $Mg_{0.70}Fe_{0.30}$. After hydrogen absorption, the broad peak of (110) $MgH_2$ may be observed at 27.7 degrees for all the samples and the peak's intensity increases with Fe concentration. The sharp Mg (0002) peak remains in the samples of $Mg_{1-x}Fe_x$ (x=0-0.15) but is absent for the x=0.3 films. With the increase of Fe content, the intensity of Mg peak decreases accordingly, which is similar to the as-deposited films. The co-existence of the Mg and $MgH_2$ phases may imply incomplete hydrogenation during the first absorption cycling, which is in agreement with the hydrogen absorption measurements. For the hydrogenated $Mg_{0.70}Fe_{0.30}$, a weak and broad peak (marked by circle in FIG. 10) may be seen around 56 degree (not seen for other compositions). The peak may be interpreted as (004) of $Mg_2FeH_6$. The XRD scan suggests that during the first cycle $Mg_{0.70}Fe_{0.30}$ was fully hydrogenated and consists of a mixture of the binary hydride $MgH_2$ and ternary hydride $Mg_2FeH_6$, which is in agreement with the hydrogen absorption result (FIG. 8).

As shown in FIG. 10, XRD patterns of dehydrogenated films look surprisingly similar to the hydrogenated ones. Both Mg and $MgH_2$ peaks are present for the $Mg_{1-x}Fe_x$ (x=0-0.15) thin films, with weaker intensities of the $MgH_2$ peaks compared to the hydrogenated samples. This may indicate that $MgH_2$ was not completely transformed back to Mg after completion of the first cycle. These XRD results confirm the hydrogenation measurements conclusion that activation cycling is needed to achieve a steady state for hydrogenation/dehydrogenation of Mg—Fe thin film. As for the dehydrogenated $Mg_{0.70}Fe_{0.30}$, only $Mg_2FeH_6$ peaks are visible. This result may suggest that the ternary hydride $Mg_2FeH_6$ is more stable in the conditions of the example.

Figure 11:
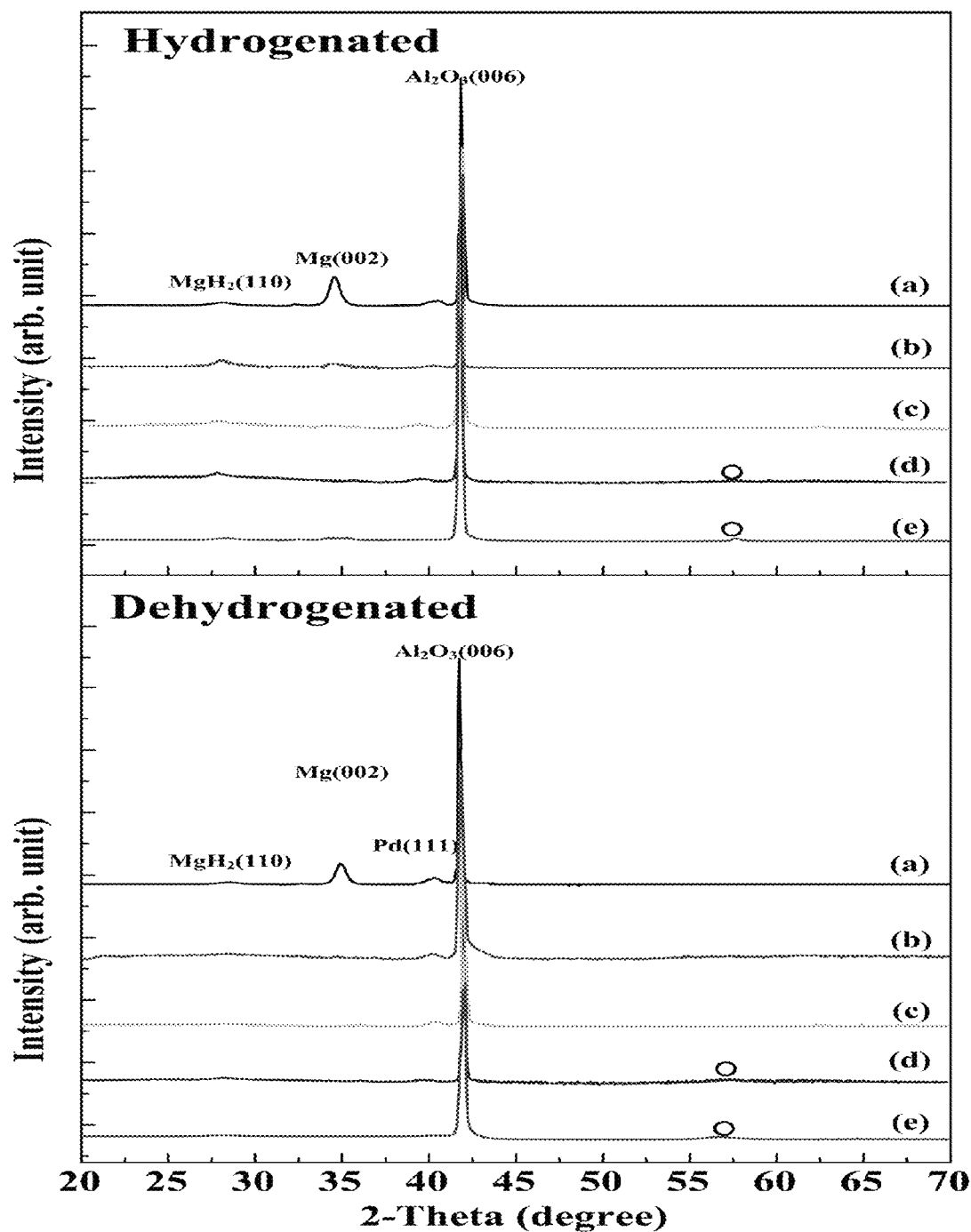
FIG. 11 shows XRD patterns of the hydrogenated and dehydrogenated $Mg_{1-x}Fe_x$ of FIGS. 4-8 during a fifth cycle.

XRD scans of hydrogenated and dehydrogenated $Mg_{1-x}Fe_x$ (x=0-0.30) thin films during the fifth cycle are shown in FIG. 11 and are representative of steady state structures. XRD patterns of the hydrogenated and dehydrogenated $Mg_{1-x}Fe_x$ (x=0-0.30) samples during the fifth cycle are shown as follows: (a) pure Mg, (b) $Mg_{0.95}Fe_{0.05}$, (c) $Mg_{0.90}Fe_{0.10}$, (d) $Mg_{0.85}Fe_{0.15}$, and (e) $Mg_{0.70}Fe_{0.30}$. For the pure Mg (x=0) thin films the intense (0002) Mg peak is present in both hydrogenated and desorbed states, which suggests that without iron Mg may be only partially hydrogenated, even after the four-cycle activation procedure. For the hydrogenated $Mg_{1-x}Fe_x$ (x=0.5-0.30), the Mg peak has almost vanished and the peak from (110) $MgH_2$ is broad but visible. The XRD scans are similar with one exception. The presence of a broad peak from $Mg_2FeH_6$ (indicated by a circle in FIG. 11) wherein x>0.15 is apparent and the $Mg_2FeH_6$ peaks remain in the desorbed state for theses two compositions.

Observation of the $Mg_2FeH_6$ peak suggests the following: (a) Mg reacts with Fe in the presence of hydrogen and forms $Mg_2FeH_6$ in the x=0.3 composition; (b) the stability of $Mg_2FeH_6$ at 415 K is high enough to remain intact during dehydrogenation; and (c) the presence of $Mg_2FeH_6$ prevents hydrogenation cycling and limits hydrogen capacity. These inferences from the XRD measurements are in agreement with the volumetric measurements. The XRD results elucidate that the small reversible capacity of the $Mg_{0.70}Fe_{0.30}$ thin films at 413 K occurs only by cycling $MgH_2$, whereas $Mg_2FeH_6$ that formed during first cycles remains inert. This observation is consistent with the reported results on desorption temperatures above 623 K for $Mg_2FeH_6$.

Some of the XRD results may be difficult to interpret. For example, it may not be clear as to why the desorption after fifth cycle doesn't result in the presence of Mg peaks in the dehydrogenated state. According to the volumetric measurements, the $Mg+2H \Leftrightarrow MgH_2$ reaction is clearly occurring, at least for the lower Fe concentration films. This may be because continuous structural refinement occurs during the cycling and columnar Mg grains of as-deposited films are convert to nanograins. The nanosized grains along with introduced defects may have very limited correlation length and may scatter as amorphous-like material. The result of the XRD measurements showing an absence of Fe peaks in all stages of hydrogenation and for all compositions, even x=0.3, may be interpreted as the metastable solubility of Fe in hcp (hexagonal close-packed) Mg.

Disclosed herein is a two-phase structure with fast-diffusing HDM (e.g. Fe) separating fine grains of HFS (e.g. Mg) in thin films and an evaluation of the structural beneficial effect on low-temperature (<423 K) hydrogenation, and how concentration of HDM may affect the hydrogenation properties. The disclosed micro-structure may demonstrate that electron beam co-deposition of HFS and HDM on a substrate, such as sapphire, without heating, creates a structure of HDM layers or channels percolating HFS film and enveloping HFS grains of about 5 to about 10 nm's in diameter. The channels may be continuous throughout the film and may consist of nano-size HDM (e.g. bcc-Fe grains). Direct volumetric Sieverts measurements of the films' hydrogen uptake and cycling show that presence of HDM may significantly enhance the hydrogen storage capacity of the presently disclosed hydrogen storage material. The kinetics of dehydrogenation/hydrogenation, in comparison to the pure HFS thin films, may also be enhanced with aspects of the presently disclosed hydrogen storage media.

The $M_{g1-x}F_{ex}$ thin films show good cycling behavior and remain structurally intact after the cycling. Best results may be obtained for the films with x=0.05-0.15. As the value x increases beyond 0.15, the reversible hydrogen storage capacity may degrade. The formation of the stable ternary hydride $Mg_2FeH_6$, which may be inert at the temperature of the examples for desorption, may be responsible for the degradation.

An example of the presently disclosed hydrogen storage material, shows that an Fe phase dispersed throughout Mg and/or $MgH_2$ grains acts as a "highway" or channels and disperser to facilitate fast delivery of hydrogen atoms to the Mg phase, as well as the dissociation and re-association of hydrogen. The structures of the thin films before and after hydrogenation during different cycles were shown in the examples by X-ray diffraction and transmission electron microscopy. It is hereby shown that there may be a remarkable improvement in reversible hydrogen storage capacity and/or kinetics for the $Mg_{1-x}Fe_x$ films disclosed herein, in comparison to pure Mg film. The improvement may be attributed to the presence of Fe layers or channels percolating throughout the Mg matrix. For the $Mg_{1-x}Fe_x$ films with x≤0.15, it is shown that more than 4.0% mass fraction hydrogen may be absorbed under hydrogen pressures of 0.1 MPa in less than 5 min, and about 3.5% mass fraction hydrogen may be desorbed in 10 min.

The invention claimed is:

1. A hydrogen storage material comprising:
   a hydride-forming solid disposed in a film;
   a hydrogen-diffusing solid media disposed in the film with said hydride-forming solid; and
   a high density of interfaces between said hydride-forming solid and said hydrogen-diffusing solid media in the film.

2. The hydrogen storage material of claim 1 wherein said hydride-forming solid is selected from the group consisting of Mg, Li, Na, and Al.

3. The hydrogen storage material of claim 2 wherein said hydride-forming solid comprises Mg.

4. The hydrogen storage material of claim 1 wherein said hydrogen-diffusing solid media comprises a transitional metal.

5. The hydrogen storage material of claim 1 wherein said hydrogen-diffusing solid media is selected from the group consisting of Fe, Ti, V, Mn, Co, Ni, Cu, and Pd.

6. The hydrogen storage material of claim 5 wherein said hydrogen-diffusing solid media comprises Fe.

7. The hydrogen storage material of claim 1 wherein said hydride-forming solid comprises Mg and said hydrogen-diffusing solid media comprises Fe.

8. The hydrogen storage material of claim 1 wherein said hydride-forming solid and said hydrogen-diffusing solid media are disposed in the film at an atomic ratio between about 0.95 and about 0.85.

9. The hydrogen storage material of claim 1 wherein said hydride-forming solid is Mg and said hydrogen-diffusing solid media hydrogen storage material is Fe, said Mg and said Fe being present in the film at an atomic ratio of $Mg_{1-x}Fe_x$ wherein x is between about 0.05 and about 0.15.

10. The hydrogen storage material of claim 1 made by co-depositing said hydride-forming solid and said hydrogen-diffusing solid media to form the film.

11. A hydrogen storage material made by co-depositing a hydride-forming solid and a hydrogen-diffusing solid media to form a film having a high density of interfaces between a first phase comprising said hydride-forming solid and a second phase comprising said hydrogen-diffusing solid media.

12. The hydrogen storage material of claim 11 wherein said hydride-forming solid and said hydrogen-diffusing solid media form separate and distinct solid phases upon co-deposition.

13. The hydrogen storage material of claim 12 wherein said hydride-forming solid is Mg and said hydrogen-diffusing solid media is Fe.

14. A hydrogen storage material comprising a hydride-forming solid and a hydrogen-diffusing solid media, said hydride-forming solid and said hydrogen-diffusing solid media forming different solid phases with a high density of interfaces therebetween upon forming said hydrogen storage material by co-depositing said hydride-forming solid and said hydrogen-diffusing solid media.

15. The hydrogen storage material of claim 14 wherein said hydride-forming solid is selected from the group consisting of Mg, Li, Na, and Al.

16. The hydrogen storage material of claim 15 wherein said hydride-forming solid comprises Mg.

17. The hydrogen storage material of claim 14 wherein said hydrogen-diffusing solid media comprises a transitional metal.

18. The hydrogen storage material of claim 14 wherein said hydrogen-diffusing solid media is selected from the group consisting of Fe, Ti, V, Mn, Co, Ni, Cu, and Pd.

19. The hydrogen storage material of claim 18 wherein said hydrogen-diffusing solid media comprises Fe.

20. The hydrogen storage material of claim 15 wherein said hydride-forming solid is Mg and said hydrogen-diffusing solid media material is Fe, said Mg and said Fe being present in said hydrogen storage material at an atomic ratio of $Mg_{1-x}Fe_x$ wherein x is between about 0.05 and about 0.15.

* * * * *